(12) United States Patent
Zhang (10) Patent No.: US 8,468,354 B2
(45) Date of Patent: *Jun. 18, 2013

(54) BROKER-BASED INTERWORKING USING HIERARCHICAL CERTIFICATES

(75) Inventor: Junbiao Zhang, Bridgewater, NJ (US)

(73) Assignee: Thomson Licensing, Boulogne-Billcourt (FR)

( * ) Notice: Subject to any disclaimer, the term of this patent is extended or adjusted under 35 U.S.C. 154(b) by 1643 days.

This patent is subject to a terminal disclaimer.

(21) Appl. No.: 10/517,134

(22) PCT Filed: May 27, 2003

(86) PCT No.: PCT/US03/16546
§ 371 (c)(1),
(2), (4) Date: Dec. 6, 2004

(87) PCT Pub. No.: WO03/105049
PCT Pub. Date: Dec. 18, 2003

(65) Prior Publication Data
US 2005/0240760 A1    Oct. 27, 2005

Related U.S. Application Data

(60) Provisional application No. 60/386,603, filed on Jun. 6, 2002.

(51) Int. Cl.
*H04L 9/32*    (2006.01)
(52) U.S. Cl.
USPC ........... 713/175; 713/155; 713/156; 713/168; 726/3; 726/5; 726/27
(58) Field of Classification Search
USPC ............... 380/255, 270; 726/2, 3, 11, 22, 23, 726/26, 27
See application file for complete search history.

(56) References Cited

U.S. PATENT DOCUMENTS

| 5,371,794 A | 12/1994 | Difie et al. |
| 5,539,824 A | 7/1996 | Bjorklund et al. |

(Continued)

FOREIGN PATENT DOCUMENTS

| CA | 2249830 | 8/1998 |
| EP | 1146692 | 10/2001 |

(Continued)

OTHER PUBLICATIONS

Aboba, "Certificate-Based Roaming; draft-ietf-roamops-cert-01. txt", IETF Standard-Woking-Draft, Internet Engineering Task Force, vol. roamops, No. 1, Apr. 1, 1999, pp. 3-7.

(Continued)

*Primary Examiner* — Pramila Parthasarathy
(74) *Attorney, Agent, or Firm* — Robert D. Shedd; Harvey D. Fried; Jerome G. Schaefer (57) ABSTRACT

A method for authentication authorization and accounting (AAA) in an interworking between at least two networks. The at least two networks are capable of communicating with a broker and include a first network and a second network to user certificate from a user device corresponding to a user of the first network. The first network to user certificate is signed by at a first network private key and includes a broker to first network certificate and a user public key. The broker to first network certificate is signed by a broker private key and includes a first network public key. A session key is sent from the second network to the user device when the broker to first network certificate and the first network to user certificate are determined to be authentic by the second network based upon the broker public key and the first network public key, respectively. The session key is encrypted with the user public key. The session key is permitting the user device to access the second network.

18 Claims, 5 Drawing Sheets

U.S. PATENT DOCUMENTS

| | | | |
|---|---|---|---|
| 5,689,563 A | 11/1997 | Brown et al. | |
| 5,850,444 A | 12/1998 | Rune | |
| 6,069,947 A | 5/2000 | Evans et al. | |
| 6,115,699 A | 9/2000 | Hardjono | |
| RE36,946 E | 11/2000 | Diffie et al. | |
| 6,233,577 B1 | 5/2001 | Ramasubramani et al. | |
| 6,393,482 B1 | 5/2002 | Rai et al. | |
| 6,463,534 B1 | 10/2002 | Geiger et al. | |
| 6,535,493 B1 | 3/2003 | Lee et al. | |
| 6,553,493 B1 | 4/2003 | Okumura et al. | |
| 6,772,331 B1 | 8/2004 | Hind et al. | |
| 6,856,800 B1 | 2/2005 | Henry et al. | |
| 6,879,690 B2 | 4/2005 | Faccin et al. | |
| 6,915,345 B1 | 7/2005 | Tummala et al. | |
| 6,961,776 B1 * | 11/2005 | Buckingham et al. | 709/229 |
| 7,028,186 B1 | 4/2006 | Stenman et al. | |
| 7,046,998 B2 * | 5/2006 | Verma et al. | 455/418 |
| 7,171,198 B2 | 1/2007 | Paila et al. | |
| 7,174,018 B1 | 2/2007 | Patil et al. | |
| 7,207,060 B2 * | 4/2007 | Immonen et al. | 726/10 |
| 7,231,203 B2 * | 6/2007 | Marcelli | 455/411 |
| 7,721,106 B2 * | 5/2010 | Zhang | 713/182 |
| 7,738,721 B2 | 6/2010 | Gomila et al. | |
| 2001/0010046 A1 | 7/2001 | Muyres et al. | |
| 2001/0051758 A1 | 12/2001 | Fukuda | |
| 2002/0037708 A1 | 3/2002 | McCann et al. | |
| 2002/0120536 A1 | 8/2002 | Maung et al. | |
| 2002/0174335 A1 | 11/2002 | Zhang et al. | |
| 2003/0039234 A1 | 2/2003 | Sharma et al. | |
| 2003/0056096 A1 | 3/2003 | Albert et al. | |
| 2003/0139180 A1 | 7/2003 | McIntosh et al. | |
| 2003/0182553 A1 | 9/2003 | Medvinsky | |
| 2004/0015689 A1 | 1/2004 | Billhartz | |
| 2005/0013264 A1 | 1/2005 | Sundberg | |
| 2005/0120202 A1 | 6/2005 | Cuellar et al. | |
| 2005/0154895 A1 | 7/2005 | Zhang | |
| 2005/0239461 A1 * | 10/2005 | Verma et al. | 455/435.1 |
| 2005/0240760 A1 | 10/2005 | Zhang | |
| 2006/0013170 A1 * | 1/2006 | Shin et al. | 370/338 |

FOREIGN PATENT DOCUMENTS

| | | |
|---|---|---|
| GB | 2369530 | 5/2002 |
| GB | 2402842 | 6/2003 |
| GB | 2402842 | 12/2004 |
| JP | 9-74408 A | 3/1997 |
| JP | 2000-244547 A | 9/2000 |
| JP | 2001524777 | 12/2001 |
| JP | 2003-324419 A | 11/2003 |
| WO | WO9927678 | 6/1999 |
| WO | 00/02407 | 1/2000 |
| WO | WO 00/72506 A1 | 11/2000 |
| WO | 00/76194 A1 | 12/2000 |
| WO | 01/76297 A1 | 10/2001 |
| WO | 02065696 A1 | 8/2002 |
| WO | 02/102009 A2 | 12/2002 |

OTHER PUBLICATIONS

Park, "On Certificate-Based Security Protocols for Wireless Mobile Communication Systems", IEEE Network, vol. 11, No. 5, New York, NY, Sep. 1, 1997, pp. 50-55.

Supplemental European Search Report for EP 03 73 6718 dated Oct. 7, 2010.

Search Report Dated Jul. 21, 2003.

Menezes, Oorschot, Vanstone: "Handbook of Applied Cryptography", CRC Press Series on Discrete Mathematics and Its Applications, 1997, XP002322259 Boca Raton, FL, US.

Ala-Laurita J et al.: "Wireless Len Access Network Architecture for Mobile Operators", IEEE Communications Magazine, IEEE Service Center, Piscataway, NJ, US vol. 39, No. 11, Nov. 2001, pp. 82-89, XP001107810.

Ashutosh Dutta, Tao Zhang, Sunil Madhani, Kenichi Tanichhi, Kensaku Fujimotor, Yasuhiro Katsube, Yoshihiro Ohba, Henning Schulzinne, "Secure Universal Mobility for wireless internet", Oct. 2004, WMASH '04: Proceedings of teh 2nd ACM International Workshop on Wireless Mobile Applications and Services on WLAN hotspots, pp. 71-80.

Tetsuya Kawase et al., "The Proposal of Secure Remote Access Using Encryption", The Institute of Electronics Information and Communication Engineers, Technical Report of IEICE, Aug. 25, 2004, pp. 1-9, vol. 97, Issue 493, Keio University, Yokohama, 223, Japan.

R.K. Shyamasundar et al. MicroBill: An Efficient Secure System for Subscription Based Services, pp. 1-13, Springer-Verlag, 2002.

Joon S. Park et al. Binding Identities and Attributtes Using Digitally Signed Certificates, pp. 120-127, IEEE, 2000.

ChangSeon Park, On Certificate-Based Security Protocols for Wireless Mobile Communication Systems, pp. 50-55, IEEE 1997.

Charles E. Perkins, IEEE Communication Mobile IP Joins Forces With AAA Aug. 1, 2000.

* cited by examiner

BROKER-BASED INTERWORKING USING HIERARCHICAL CERTIFICATES

This application claims the benefit, under 35 U.S.C. §365 of International Application PCT/US03/16546, filed May 27, 2003, which was published in accordance with PCT Article 21(2) on Dec. 18, 2003 in English and which claims the benefit of U.S. provisional patent application No. 60/386,603, filed Jun. 6, 2002.

BACKGROUND OF THE INVENTION

1. Field of the Invention

The present invention generally relates to networking and, more particularly, to broker-based interworking Authentication, Authorization and Accounting (AAA) using hierarchical certificates.

2. Background of the Invention

Typically, Authentication, Authorization and Accounting (MA) are required to access and utilize networks such as cellular networks and Wireless Local Area Networks (WLANs). In an environment in which a mobile terminal has multiple network access mechanisms, providing AAA interworking among these networks is of great importance. However, it is generally the case that the involved networks do not belong to the same administrative domain and do not share the same AAA schemes. Moreover, it is difficult for a cellular operator to establish a contract relationship with each and every wireless LAN operator and vice versa. Further, the mobile user that has signed up for interworking should not be aware of any third party involved in the interworking, i.e. they only need to maintain a single account, i.e., their own cellular account.

There are two main types of interworking between cellular networks and WLANs: tight coupling and loose coupling. In a loose coupling scenario, the WLAN and the cellular network have independent data paths but the AAA for WLAN users relies on cellular network MA functions. However, the cellular network AAA protocols (MAP/SS7) are incompatible with Internet Protocol (IP) based protocols used by WLAN users.

To address the problems of the networks not belonging to the same administrative domain and of not sharing the same AAA schemes, special interworking functions or gateways were proposed to bridge between cellular network and WLAN AAA schemes. Some of these special functions require that the cellular network Home Location Register (HLR) be adapted; however, this is not desirable for many reasons, particularly from the perspective of the cellular operators.

Conventional broker models directed to the problem of establishing contracts between each and every WLAN and cellular network operator all require that the broker deploy AAA engines that are involved in mobile user authentication in real-time; this easily creates a single point of failure. Some of these broker models also require that a mobile user create a separate account with the broker; this is quite inconvenient for the user.

Accordingly, it would be desirable and highly advantageous to have an interworking AAA scheme that overcomes the above-described problems of prior art interworking AAA schemes.

SUMMARY OF THE INVENTION

The problems stated above, as well as other related problems of the prior art, are solved by the present invention, broker-based interworking Authentication, Authorization and Accounting (AAA) using hierarchical certificates.

The present invention is particularly useful for, but is not limited to, the loose coupling scenario in cellular data network and WLAN interworking. By deploying a broker, the cellular operators do not have to establish a contract relationship with each and every wireless LAN operator for interworking. It is thus much more scalable than prior art approaches. Further, by using hierarchical certificates, the broker does not have to maintain any mobile user information. Mobile users can just use their cellular account to get access to wireless LANs having contracts with their cellular operators.

According to an aspect of the present invention, there is provided a method for Authentication Authorization and Accounting (AAA) in an interworking between at least two networks. The at least two networks are capable of communicating with a broker and include a first network and a second network. The second network receives a broker public key from the broker and a first network to user certificate from a user device corresponding to a user of the first network. The first network to user certificate is signed by a first network private key and includes a broker to first network certificate and a user public key. The broker to first network certificate is signed by a broker private key and includes a first network public key. A session key is sent from the second network to the user device when the broker to first network certificate and the first network to user certificate are determined to be authentic by the second network based upon the broker public key and the first network public key, respectively. The session key is encrypted with the user public key. The session key is used for permitting the user device to access the second network.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to broker-based interworking Authentication, Authorization and Accounting (AAA) using hierarchical certificates. It is to be appreciated that the present invention is applicable to any combination of access networks. However, the present invention is particularly applicable to cellular network and Wireless Local Area Network (WLAN) interworking.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
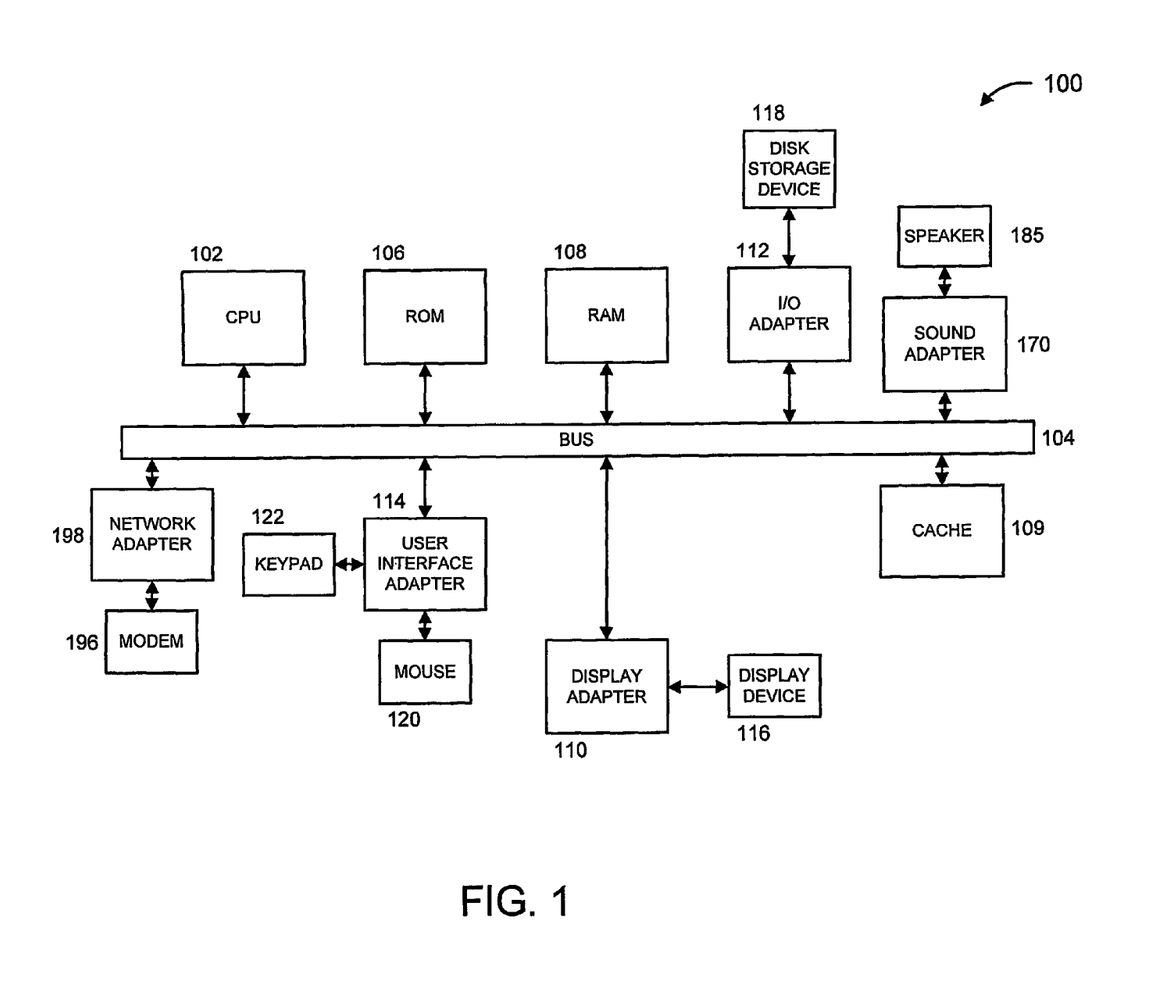
FIG. 1 is a block diagram illustrating a computer system 100 to which the present invention may be applied, according to an illustrative embodiment of the present invention.

FIG. 1 is a block diagram illustrating a computer system 100 to which the present invention may be applied, according to an illustrative embodiment of the present invention. Computer system 100 may be implemented, for example, in a mobile device used to access a wireless LAN or a cellular network, or an access point for implementing a wireless LAN, by including the necessary communications interface elements and processing elements as is known in the art. In the case of a mobile user device, computer system 100 would include, for example, the necessary radio interfaces for communicating with the required radio access networks, as well as the processing elements for encoding and decoding the messages according to the applicable standards. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter 199, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112. A mouse 120 and keyboard 122 are operatively coupled to system bus 104 by user interface adapter 114. The mouse 120 and keyboard 122 are used to input and output information to and from system 100.

At least one speaker (herein after "speaker") 197 is operatively coupled to system bus 104 by sound adapter 199.

A (digital and/or analog) modem 196 is operatively coupled to system bus 104 by network adapter 198.

The present invention provides an approach to AAA in which a broker is employed. The broker serves as a certificate authority instead of a real-time authentication engine. Thus, the broker is no longer a single point of failure. The broker issues certificates to the wireless networks which, in turn, issue their own certificates to individual mobile users subscribed to the interworking service.

Figure 2:
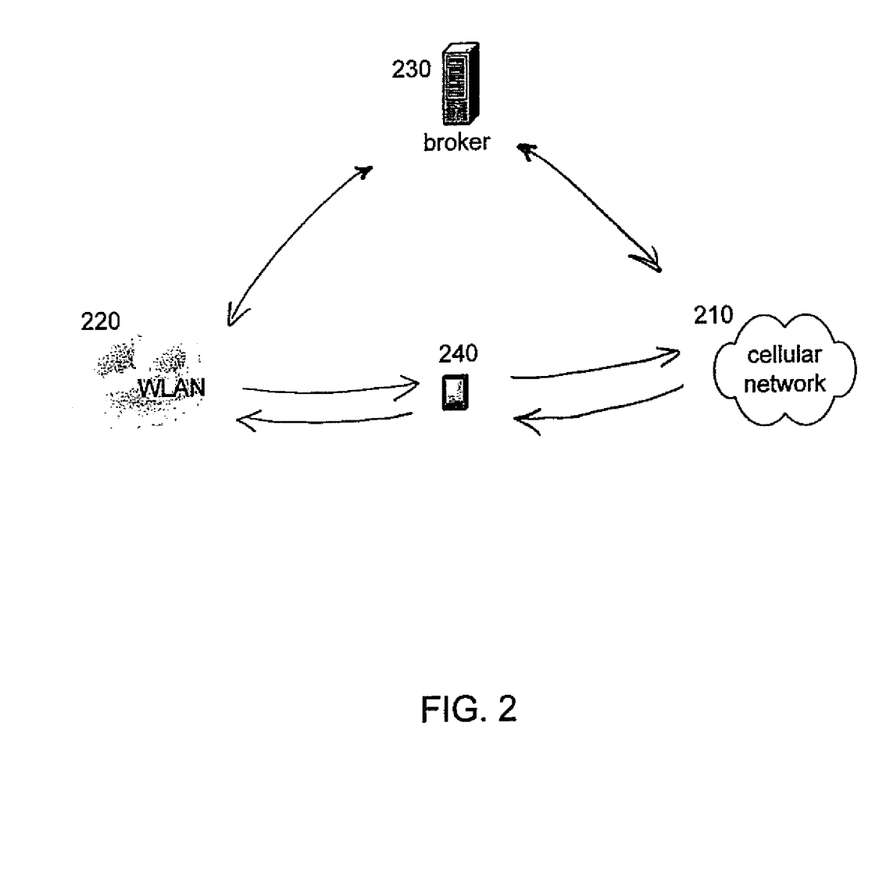
FIG. 2 is a block diagram illustrating a communication structure to which the present invention may be applied, according to an illustrative embodiment of the present invention.

FIG. 2 is a block diagram illustrating a communication structure to which the present invention may be applied, according to an illustrative embodiment of the present invention. In the illustrative embodiment of FIG. 2, the communication structure includes a cellular network 210, a Wireless Local Area Network (WLAN) 220, a broker 230, and a mobile user 240. The present invention provides a certificate based scheme to provide AAA services to WLAN users. As noted above, the present invention may be applied to any combination of networks, including different numbers and different types of networks.

Figure 3:
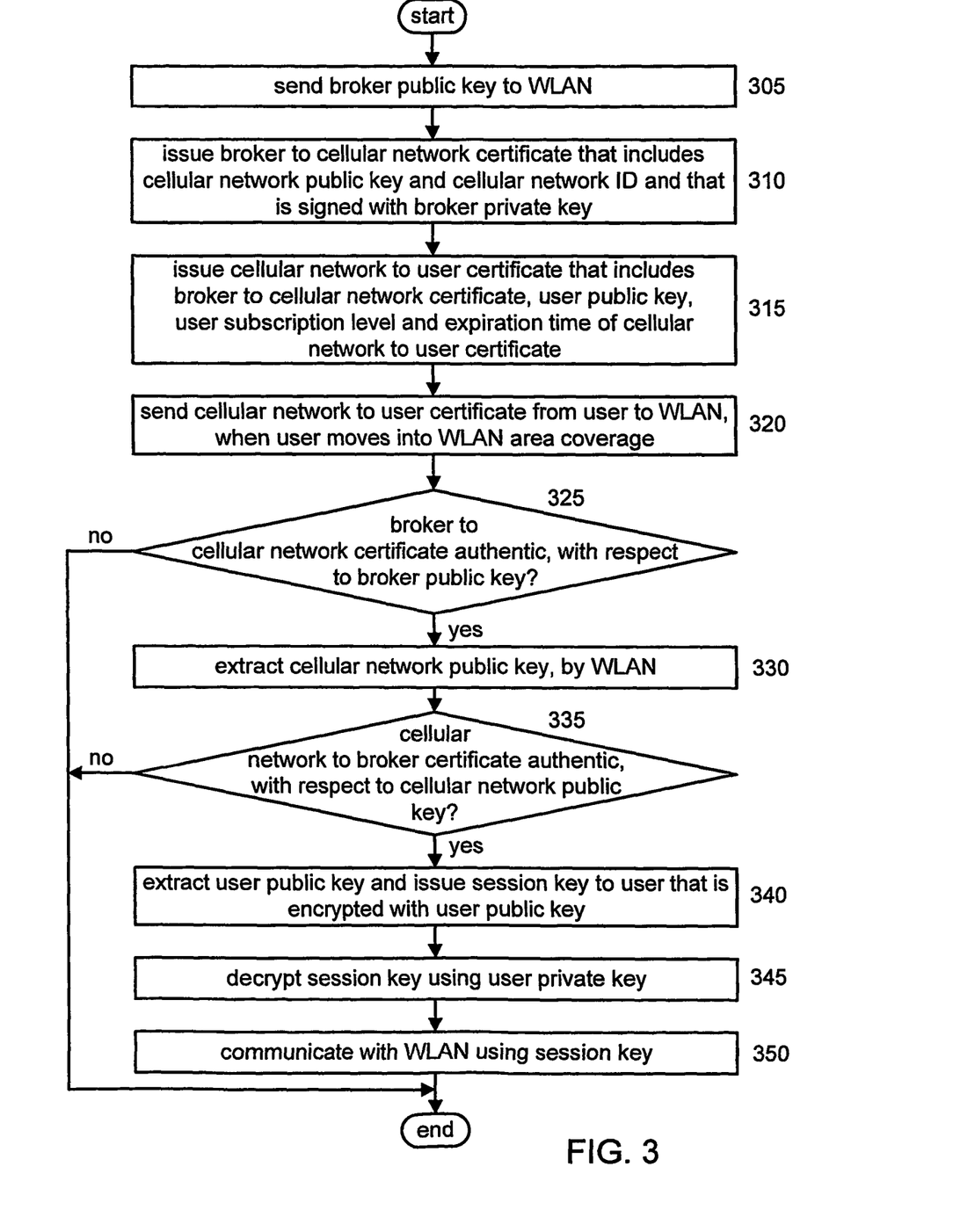
FIG. 3 is a flow diagram illustrating a broker-based method for Authentication Authorization and Accounting (AAA) of a mobile user in a loose coupling interworking between access networks, according to an illustrative embodiment of the present invention.

FIG. 3 is a flow diagram illustrating a broker-based method for Authentication Authorization and Accounting (AAA) of a mobile user in a loose coupling interworking between access networks, according to an illustrative embodiment of the present invention. The access networks include a cellular network and a Wireless Local Area Network (WLAN). The cellular network is associated with at least a mobile user. It is to be appreciated that while the illustrative embodiment of FIG. 3 (as well as the illustrative embodiment of FIG. 4 below) is described with respect to a cellular network and a WLAN, any combination of networks, including the preceding and other types of networks as well as different numbers of networks (e.g., one cellular network and three WLANs, two cellular networks and two WLANs, and so forth), may be readily employed in accordance with the present invention while maintaining the spirit and scope of the present invention. It is to be further appreciated in preferred embodiments of the present invention, there will likely be a single cellular network to which the mobile user has initially contracted with for service, and a plurality of WLANs that have an interworking contract with the single cellular network. The interworking contract may be implemented with various known communications methods between the WLANs and the cellular network.

A public key $K_{pub\_b}$ of the broker is sent from the broker to the WLAN, the latter having an interworking contract with the cellular network (step 305). In the event that the cellular network has an interworking contract with more than one WLAN, then the broker could send the public key $K_{pub\_b}$ to all of these WLANs. It is preferable, but not mandatory, that the public key $K_{pub\_b}$ of the broker is sent via a secure channel so that the WLAN can be sure that the public key $K_{pub\_b}$ is indeed the public key of the broker.

A broker to cellular network certificate is issued to the cellular network by the broker (step 310). The broker to cellular network certificate includes, but is not limited to, the following: a public key $K_{pub\_cn}$ of the cellular network; and an ID of the cellular network. The broker to cellular network certificate is signed with a private key $K_{pri\_b}$ of the broker.

Upon a mobile user signing up with the cellular network for WLAN interworking service, a cellular network to mobile user certificate is issued to the mobile user by the cellular network (step 315). The cellular network to mobile user certificate includes, but is not limited to, the following: the broker to cellular network certificate; a public key $K_{pub\_m}$ of the mobile user; a mobile user subscription level (whether the mobile user is subscribed for WLAN interworking service); an expiration time of the cellular network to mobile user certificate. The cellular network to mobile user certificate is signed with a private key $K_{pri\_cn}$ of the cellular network.

Upon the mobile user moving into an area under coverage of the WLAN, the mobile user sends his/her certificate (i.e., the cellular network to mobile user certificate) to the WLAN (e.g., an Access Point (AP) or other entity of the WLAN) (step 320). It is determined by the WLAN whether the broker to cellular network certificate (included in the cellular network to mobile user certificate) is authentic, using the public key $K_{pub\_b}$ of the broker (sent to the WLAN at step 305) (step 325). If the broker to cellular network certificate is not authentic, then the method is terminated. However, if the broker to cellular network certificate is authentic, then the WLAN extracts the public key $K_{pub\_cn}$ of the cellular network (from the broker to cellular network certificate included in the cellular network to mobile user certificate) (step 330). Using the public key $K_{pub\_cn}$ of the cellular network, it is determined by the WLAN whether the cellular network to mobile user certificate is authentic (step 335).

If the cellular network to mobile user certificate is not authentic, then the method is terminated. However, if the cellular network to mobile user certificate is authentic, then the WLAN extracts the public key $K_{pub\_m}$ of the mobile user from the cellular network to mobile user certificate and issues a session key to the mobile user that is encrypted with the public key $K_{pub\_m}$ of the mobile user (step 340). The session key may be, but is not limited to, a per user Wired Equivalent Privacy (WEP) key.

The encrypted session key is decrypted by the mobile user using his/her private key $K_{pri\_m}$ (step 345). The mobile user and the WLAN communicate using the session key (i.e., all subsequent communication between the mobile user and the WLAN is encrypted with the session key) (step 350). The mobile user is authenticated by the WLAN since only that specific mobile user has the necessary private key $K_{pri\_m}$ to decrypt the session key.

Figure 4A:
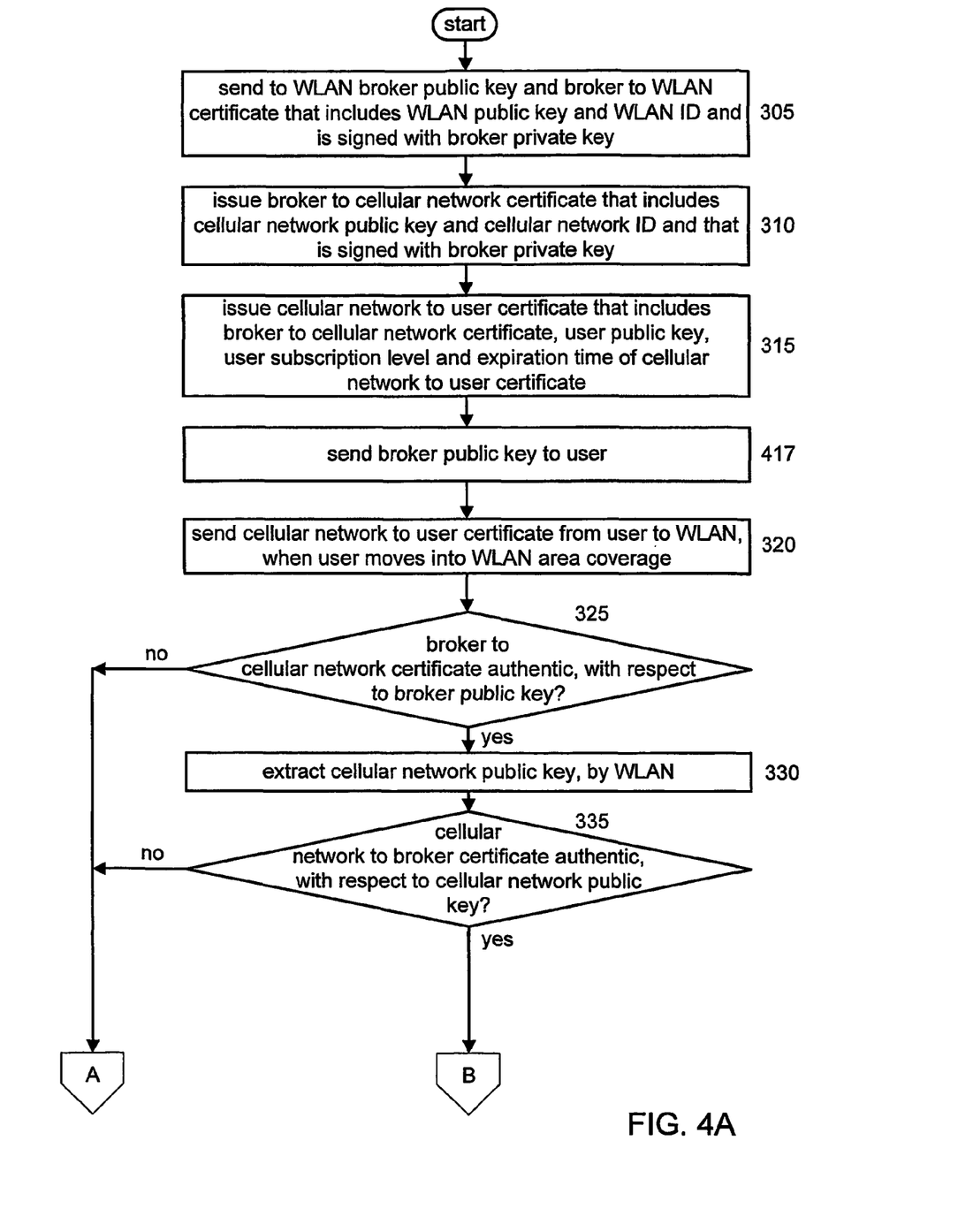
FIG. 4 is a flow diagram illustrating a certificate based method for Authentication Authorization and Accounting (AAA) of a mobile user in a loose coupling interworking between access networks, according to another illustrative embodiment of the present invention.
Figure 4B:
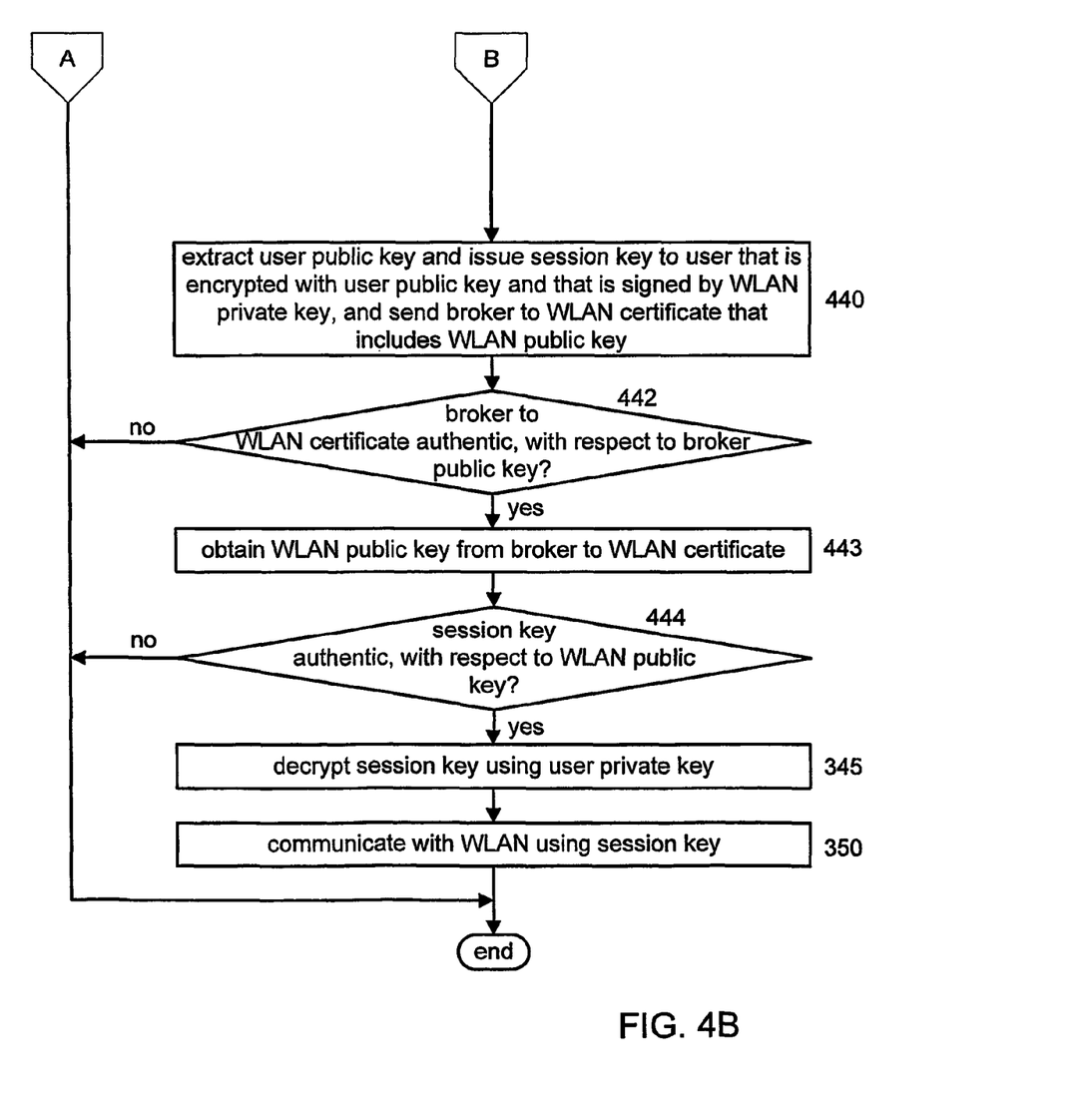

FIG. 4 is a flow diagram illustrating a certificate based method for Authentication Authorization and Accounting (AAA) of a mobile user in a loose coupling interworking between access networks, according to another illustrative embodiment of the present invention. The access networks include a cellular network and a Wireless Local Area Network (WLAN). The cellular network is associated with at least a mobile user. The method of FIG. 4 allows for mutual authentication between the mobile user and the WLAN, so that the mobile user can also verify that he/she is indeed talking to a legitimate WLAN (to prevent, e.g., messages from being snooped).

A public key $K_{pub\_b}$ of the broker and a broker to WLAN certificate are sent from the broker to the WLAN, the latter having an interworking contract with the cellular network (step 405). The broker to WLAN certificate includes, but is not limited to, the following: a public key $K_{pub\_w}$ of the WLAN; and an ID of the WLAN. The broker to WLAN certificate is signed with a private key $K_{pri\_b}$ of the broker.

In the event that the cellular network has an interworking contract with more than one WLAN, then the broker could send the public key $K_{pub\_b}$ to all of these WLANs. It is preferable, but not mandatory, that the public key $K_{pub\_b}$ of the broker is sent via a secure channel so that the WLAN can be sure that the public key $K_{pub\_b}$ is indeed the public key of the broker.

A broker to cellular network certificate is issued to the cellular network by the broker (step 410). The broker to cellular network certificate includes, but is not limited to, the following: a public key $K_{pub\_cn}$ of the cellular network; an ID of the cellular network; and a public key $K_{pub\_b}$ of the broker. The broker to cellular network certificate is signed with a private key $K_{pri\_b}$ of the broker.

Upon a mobile user signing up with the cellular network for WLAN interworking service, a cellular network to mobile user certificate is issued to the mobile user by the cellular network (step 415). The cellular network to mobile user certificate includes, but is not limited to, the following: the broker to cellular network certificate; a public key $K_{pub\_m}$ of the mobile user; a mobile user subscription level (whether the mobile user is subscribed for WLAN interworking service); an expiration time of the cellular network to mobile user certificate. The cellular network to mobile user certificate is signed with a private key $K_{pri\_cn}$ of the cellular network. The public key $K_{pub\_b}$ of the broker is also sent to the mobile user (step 417).

Upon the mobile user moving into an area under coverage of the WLAN, the mobile user sends his/her certificate (i.e., the cellular network to mobile user certificate) to the WLAN (e.g., an Access Point (AP) or other entity of the WLAN) (step 420). It is determined by the WLAN whether the broker to cellular network certificate (included in the cellular network to mobile user certificate) is authentic, using the public key $K_{pub\_b}$ of the broker (sent to the WLAN at step 405) (step 425). If the broker to cellular network certificate is not authentic, then the method is terminated. However, if the broker to cellular network certificate is authentic, then the WLAN extracts the public key $K_{pub\_cn}$ of the cellular network (from the broker to cellular network certificate included in the cellular network to mobile user certificate) (step 430). Using the public key $K_{pub\_cn}$ of the cellular network, it is determined by the WLAN whether the cellular network to mobile user certificate is authentic (step 435).

If the cellular network to mobile user certificate is not authentic, then the method is terminated. However, if the cellular network to mobile user certificate is authentic, the WLAN extracts the public key $K_{pub\_m}$ of the mobile user and issues a session key to the mobile user that is encrypted with the public key $K_{pub\_m}$ of the mobile user and is signed by a private key $K_{pri\_w}$ of the WLAN and also sends to the mobile user the broker to WLAN certificate that is signed by the private key $K_{pri\_b}$ of the broker (step 440). The broker to WLAN certificate includes a public key $K_{pub\_w}$ of the WLAN. The session key may be, but is not limited to, a per user Wired Equivalent Privacy (WEP) key.

It is determined by the mobile user whether the broker to WLAN certificate is authentic, using the public key $K_{pub\_b}$ of the broker (step 442). If the broker to WLAN certificate is not authentic, then the method is terminated. However, if the broker to WLAN certificate is authentic, then the public key $K_{pub\_w}$ of the WLAN is obtained by the mobile user from the broker to WLAN certificate (step 443). It is determined by the mobile user whether the session key is authentic, using the public key $K_{pub\_w}$ of the WLAN (step 444). If the session key is not authentic, then the method is terminated.

However, if the session key is authentic, then the encrypted session key is decrypted by the mobile user using his/her private key $K_{pri\_m}$ (step 445). The mobile user and the WLAN communicate using the session key (i.e., all subsequent communication between the mobile user and the WLAN is encrypted with the session key) (step 450).

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. For example, it is clear that the invention is applicable to any combinations of wireless and mobile communications networks, including, but not limited to those based on IEEE 802.11, Hiperlan 2, etc. All such changes and modifications are intended to be included within the scope of the invention as defined by the appended claims.

What is claimed is:

1. In a wireless local area network having an interworking function, a method for interworking between the wireless local area network and a second network, the wireless local area network and the second network capable of communicating with a broker, the method comprising the steps of:
receiving from the broker, a first key;
receiving from a user device, a second network to user certificate that includes a broker to second network certificate and a second key;
authenticating the broker to second network certificate using the first key to derive a third key;
authenticating the second network to user certificate using the third key to derive the second key;
generating a session key, encrypting the session key using the second key, and transmitting the encrypted session key to the user device; and
communicating with the user device using the session key.

2. The method of claim 1, wherein the second network to user certificate further includes a user subscription level that indicates whether a user has a subscription for an interworking service, and the generating step is performed in response to the user subscription level.

3. The method of claim 1, wherein the second network to user certificate further includes an expiration time of the second network to user certificate, and the method further comprises the step of checking the expiration time to determine whether the second network to user certificate has expired.

4. The method of claim 1, further including the step of generating a wireless local area network to user certificate that is signed with a fifth key and includes the session key, whereby the wireless local area network is able to be authenticated.

5. In a wireless local area network having an interworking function, a method for interworking between the wireless local area network and a second network, the wireless local area network and the second network capable of communicating with a broker, the method comprising the steps of:
receiving, from the broker, a broker public key;
receiving, from a user device, a second network to user certificate, which is signed with a second network private key and includes a broker to second network certificate and a user public key, the broker to second network certificate being signed with a broker private key and including a second network public key;
authenticating the broker to second network certificate using the broker public key and deriving the second network public key;
authenticating the second network to user certificate using the second network public key and deriving the user public key;
generating a session key, encrypting the session key using the user public key, and transmitting the encrypted session key to the user device; and
communicating with the user device using the session key.

6. The method of claim 5, wherein the second network to user certificate further includes a user subscription level that indicates whether a user has a subscription for an interworking service, and the generating step is performed in response to the user subscription level.

7. The method of claim 5, wherein the second network to user certificate further includes an expiration time of the second network to user certificate, and the method further comprises the step of checking the expiration time to determine whether the second network to user certificate has expired.

8. The method of claim 5, further including the step of providing the user device with an ability to authenticate the wireless local area network.

9. The method of claim 8, wherein the providing step comprises the steps of:
receiving a broker to wireless local area network certificate signed with the broker private key and includes a wireless local area network private key;
generating a wireless local area network to user certificate that is signed with the wireless local area network private key and includes the encrypted session key; and
transmitting the wireless local area network to user certificate.

10. A method for communicating with a wireless local area network using a user device that has a subscription to a second network, the second network having an interworking contract with the wireless local area network, the wireless local area network and the second network capable of communicating with a broker, the method comprising the steps of:
receiving, from the second network, a second network to user device certificate, which is signed with a second network private key, and includes a broker to network certificate and a user public key;
transmitting to the wireless local area network the second network to user device certificate, wherein the wireless local area network is able to derive the user public key using a broker public key received from the broker entity;
receiving, from the wireless local area network, a session key encrypted using the user public key;
decrypting the session key with a user private key; and
communicating with the wireless local area network using the session key.

11. The method of claim 10, wherein the second network to user certificate further includes a user subscription level that indicates whether a user has a subscription for an interworking service.

12. The method of claim 10, wherein the second network to user certificate further includes an expiration time of the second network to user certificate, and the transmitting step is performed if the expiration time has not expired.

13. The method of claim 10, wherein the receiving step comprises receiving a wireless local area network to user certificate signed with the broker private key and including the session key, and further comprising the steps of receiving the broker public key, and authenticating the wireless local area network to user certificate using the broker public key and deriving the session key.

14. A broker based system for authenticating users in networks having interworking relationships, comprising:
a wireless local area network having an interworking function;
a second network; and
a broker capable of communicating with the wireless local area network and the second network, the broker having means for transmitting a broker public key to the wireless local area network, and means for transmitting a broker to second network certificate, which is signed with a broker private key and includes a second network public key, to the second network,
the second network including means for transmitting, to a user device, a second network to user certificate signed with a second network private key and includes the broker to second network certificate and the user public key,
the wireless local area network including means for authenticating the broker to second network certificate and deriving the second network public key, means for authenticating the second network to user certificate and deriving the user public key, and means for generating a session key and encrypting the session key with the user public key.

15. The system of claim 14, wherein the wireless local area network further includes means for transmitting a wireless local area network to user certificate signed with a wireless local area network private key and includes the encrypted session key.

16. A mobile device comprising:
   means for receiving from a second network a second network to user certificate that includes a broker to second network certificate and a key;
   means for transmitting said second network to user certificate to a first network;
   means for receiving a session key generated by said first network; and
   means for communicating with said first network using said session key.

17. The mobile device according to claim 16, wherein said first network is a wireless local area network having an interworking function.

18. The mobile device according to claim 16, wherein said second network is a cellular network.

* * * * *